United States Patent [19]
Murphy et al.

[11] Patent Number: 5,869,105
[45] Date of Patent: Feb. 9, 1999

[54] MOLD FOR USE IN A GAS-ASSISTED INJECTION MOLDING SYSTEM AND ADJUSTABLE OVERFLOW PIN ASSEMBLY FOR USE THEREIN

[75] Inventors: John F. Murphy, Imlay City; Randolph S. Porter, Grand Blanc, both of Mich.

[73] Assignee: Larry J. Winget, Leonard, Mich.

[21] Appl. No.: 60,232

[22] Filed: Apr. 14, 1998

[51] Int. Cl.⁶ ............................ B29C 45/16; B29C 45/40
[52] U.S. Cl. .......................... 425/130; 264/572; 425/572
[58] Field of Search .......................... 264/572; 425/130, 425/57

[56] References Cited

U.S. PATENT DOCUMENTS

| | | | |
|---|---|---|---|
| 4,734,027 | 3/1988 | Adams | 425/572 |
| 5,090,886 | 2/1992 | Jaroschek | 425/130 |
| 5,098,637 | 3/1992 | Hendry | 264/572 |
| 5,423,667 | 6/1995 | Jaroschek | 425/130 |
| 5,607,640 | 3/1997 | Hendry | 264/572 |

*Primary Examiner*—Tim Heitbrink
*Attorney, Agent, or Firm*—Brooks & Kushman P.C.

[57] ABSTRACT

A mold for use in a gas-assisted injection molding system includes an adjustable overflow pin assembly which includes a conical stack of shims which are removably secured to an ejector pin to move therewith within a conically-shaped spill cavity flow-coupled by a secondary runner to an article-defining cavity of the mold. The mold also includes a blocking pin assembly which together with the adjustable overflow pin assembly are mounted on an ejector plate to move therewith between extended and retracted positions of the ejector plate. The blocking pin assembly includes a blocking pin which is slidably fit within the second mold half to move relative to the ejector plate between an extended blocking position to block the flow of molten plastic through the secondary runner and a retracted position to allow the flow of molten plastic through the secondary runner and into the spill cavity. The blocking pin assembly includes a hydraulic cylinder for slidably mounting and moving the blocking pin relative to the ejector plate. The blocking pin has an end surface which partially defines the secondary runner in its retracted position and which partially defines the article-defining cavity in its extended blocking position. The adjustable overflow pin assembly and the blocking pin assembly, as well as other ejector pins mounted on the ejector plate, eject plastic from the article-defining cavity, the spill cavity, and the secondary runner in the extended position of the ejector plate.

18 Claims, 2 Drawing Sheets

MOLD FOR USE IN A GAS-ASSISTED INJECTION MOLDING SYSTEM AND ADJUSTABLE OVERFLOW PIN ASSEMBLY FOR USE THEREIN

CROSS-REFERENCE TO RELATED APPLICATIONS

This application is related to U.S. patent applications entitled "Mold For Use In A Gas-Assisted Injection Molding System And Gas Pin Assembly For Use Therein" filed Sep. 22, 1997 and having U.S. Ser. No. 08/935,013 now abandoned; "Mold For Use In A Gas-Assisted Injection Molding System And Ejector Pin Subsystem Including a Blocking Pin Assembly For Use Therein" having U.S. Ser. No. 09/060/239 filed Apr. 14, 1998 and "Mold For Use In A Gas-Assisted Injection Molding System and Ejector Pin Subsystem Including A Split Pin For Use Therein", having U.S. Ser. No. 09/059,947 filed Apr. 14, 1998 and "Mold For Use In A Plastic Injection Molding System And Venting Pin Assembly For Use Therein" having U.S. Ser. No. 09/041, 333 filed Mar. 12, 1998.

TECHNICAL FIELD

This invention relates to molds having overflows and, in particular, to molds for use in gas-assisted injection molding systems and adjustable overflow pin assemblies for use therein.

BACKGROUND ART

U.S. Pat. No. 5,098,637 discloses a method and system for injection molding hollow plastic articles with pressurized gas which provides for displacement by the gas of a portion of plastic from the mold cavity into a flow-coupled spill cavity. The volume of the spill cavity may be varied to control the quantity of displaced plastic such as by a lead screw.

U.S. Pat. No. 5,607,640 (i.e. '640 patent) discloses in FIGS. 1–4 thereof, the use of a spill cavity with a blocking pin and shims to control the volume of plastic going into the spill cavity. The pin is in its up position to block plastic flow from the article-defining cavity, through a runner and into the spill cavity. Subsequently, the pin moves to its down position to allow plastic to go to the spill cavity by pressurized gas. In the remainder of the '640 patent, a method and system are disclosed where the volume of the spill cavity is allowed to increase in a controlled fashion to a final volume based on the amount of plastic injected into the mold cavity. The volume of the spill cavity increases during a step of displacing the plastic into the spill cavity. In this way, the method and system eliminate the need for a shut-off or blocking pin. In two disclosed embodiments, pistons are utilized to purge or displace plastic from the spill cavity.

European Patent Document No. 393,315 discloses a spill subgate with a blocking hydraulic pin.

SUMMARY OF THE INVENTION

An object of the present invention is to provide a mold for use in a gas-assisted injection molding system and an adjustable overflow pin assembly for use therein wherein a conical stack of shims are removably secured to a pin to move therewith within a conically-shaped spill cavity flow coupled to an article-defining cavity of the mold, thereby resulting in a practical design which is not only relatively inexpensive but also is simple in operation and for servicing.

In carrying out the above object and other objects of the present invention, a mold for use in a gas-assisted injection molding system is provided. The mold includes a first mold half and a second mold half. The first and second mold halves are movable relative to each other between an open position and a closed position. The first and second mold halves define an article-defining cavity, a conically-shaped spill cavity, and a secondary runner for flow coupling the spill cavity to the article-defining cavity. The mold further includes an adjustable pin assembly including a pin slidably fit within the second mold half to move relative to the second mold half in the open position of the mold between extended and retracted positions and a conical stack of shims removably secured to the pin to move therewith within the conically-shaped spill cavity. The shims eject plastic from the spill cavity in the extended position of the pin. The shims have a tight fit within the spill cavity in the retracted position of the pin.

Preferably, the conical stack of shims has an outer surface taper approximately in the range of 2' to 8°.

Still, preferably, the outer surface taper is approximately 5°.

Still, preferably, the pin is an ejector pin having end face and wherein the assembly further includes a fastener for removably securing the conical stack of shims to the ejector pin.

Also, preferably, the shims are annular shims and wherein the pin has a hole which extends through an end face of the pin and wherein the fastener extends through the annular shims and into the hole to removably secure the stack of shims to the pin.

Still further in carrying out the above object and other objects of the present invention, in a mold having a first mold half and a second mold half which define an article-defining cavity, a conically-shaped spill cavity, and a secondary runner for flow coupling the spill cavity to the article-defining cavity, an adjustable overflow pin assembly is provided. The pin assembly includes a pin slidably fit within the second mold half to move relative to the second mold half in an open position of the mold between extended and retracted positions. The pin assembly also includes a conical stack of shims removably secured to the pin to move therewith within the conically-shaped spill cavity. The shims eject plastic from the spill cavity in the extended position of the pin. The annular shims have a tight fit within the spill cavity in the retracted position of the pin.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
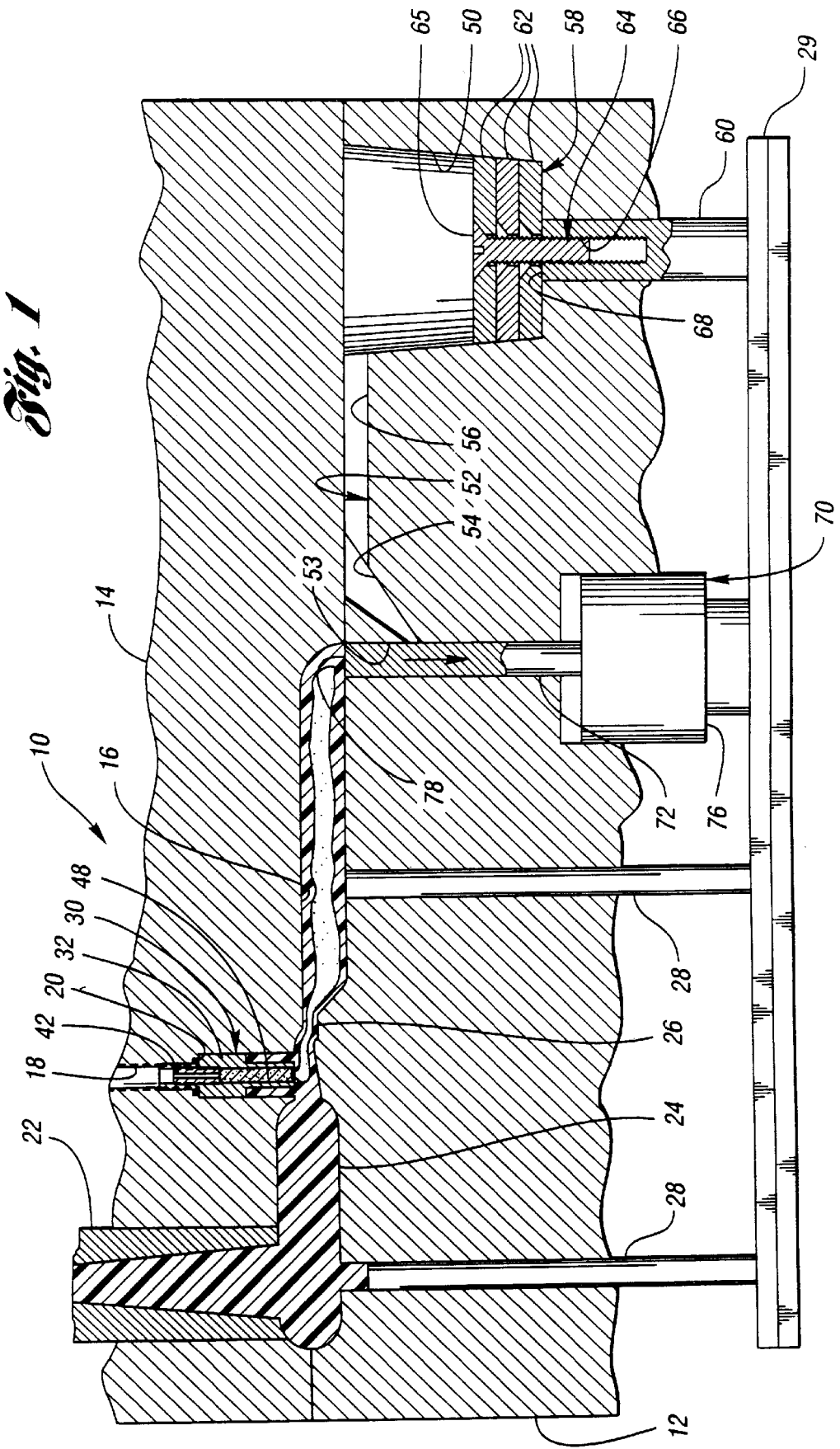
FIG. 1 is a view, partially broken away and in cross-section, of a mold and an adjustable overflow pin assembly both of which are constructed in accordance with the present invention.

Referring now to the drawing Figures, there is illustrated in FIG. 1 a mold, generally indicated at 10, for use in a gas-assisted injection molding system. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14 respectively define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Ejector pins 28 extend through the first or movable mold half 12 and are connected to an ejector plate 29. The ejector plate 29 is supported to move relative to the first mold half 12 from a retracted position to an extended position to eject a completed part from the article-defining cavity 16 as well as the plastic in the runner 24 and the sprue 22.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown).

The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

Further details of the gas pin assembly 30 can be found within the above-noted patent application Ser. No. 08/935,013 entitled "Mold For Use In A Gas-Assisted Injection Molding System And Gas Pin Assembly For Use Therein". While the gas pin assembly 30 is illustrated as the particular mechanism for injecting pressurized gas into the article-defining cavity 16, other mechanism can be utilized to inject pressurized gas into the article-defining cavity 16 as illustrated and described in the prior art patents noted in the "Background Art" portion of this application.

The mold 10 also includes a conically-shaped spill cavity 50 and a secondary runner, generally indicated at 52, for flow coupling the spill cavity 50 to the article-defining cavity 16. The secondary runner 52 includes a vertically extending portion 53, an angled portion 54 and a horizontally-extending portion 56 through which molten plastic flows from the article-defining cavity 16 to the conically-shaped spill cavity 50 upon the injection of pressurized gas into the article-defining cavity 16.

The mold 10 of the present invention also includes an adjustable overflow pin assembly, generally indicated at 58. The pin assembly 58 includes a pin 60 slidably fit within the mold half 12 and connected to the ejector plate 29 to move relative to the mold half 12 in an open position of the mold 10 upon movement of the ejector plate 29 relative to the mold half 12 between extended and retracted positions thereof.

The pin assembly 58 also includes a conical stack of annular shims 62 which are removably secured to the ejector pin 60 by means of a threaded fastener such as a screw, generally indicated at 64, which extends through the shims 62 and into an internally threaded hole 66 formed in an end face or surface 68 of the ejector pin 60. The screw 64 has a head portion 65 which is in abutting engagement with the uppermost shim 62. The top surface of the head portion 65 is flush with the top surface of this shim 62.

The shims 62 move with the ejector pins 60 within the conically-shaped spill cavity 50 during movement of the ejector plate 29 from its retracted position to its extended position so that the assembly 58 ejects plastic from the spill cavity 50.

The conical stack of shims 62 has an outer surface taper approximately in the range of 2° to 8° and is preferably approximately 5°. In this way, the shims 62 form a tight fit with the spill cavity 50 which has a corresponding taper to its interior surface. The annular shims 62 form the tight fit within the spill cavity 50 in the retracted position of the ejector plate 29.

Two or more annular shims 62 define the stack of annular shims 62. The number of annular shims 62 is dependent upon how much molten plastic need be removed from the article-defining cavity 16 to define the desired hollow plastic part formed within the article-defining cavity 16.

The mold 10 also includes a blocking pin assembly, generally indicated at 70, also mounted on the ejector plate 29 to move therewith. The blocking pin assembly 70 includes a blocking pin 72 which is also slidably fit within the mold half 12 to move relative to the ejector plate 29 to an extended plastic blocking position within the vertically extending portion 53 of the secondary runner 52 to block the flow of molten plastic through the secondary runner 52 as shown in FIG. 1.

The pin 72 is retractable within the portion 53 of the secondary runner 52 to a retracted position by a hydraulic cylinder 76 which is also mounted on the ejector plate 29 to move therewith. In the retracted position of the blocking pin 72 within the portion 53 of the secondary runner 52, molten plastic is allowed to flow from the article-defining cavity 16 into the secondary runner 52 and then into the article-defining cavity 50. The blocking pin 72 has an end surface or face 78 which partially defines the runner 52 in the retracted position of the blocking pin 72 and which partially defines the article-defining cavity 16 in the extended position of the blocking pin 72.

Figure 2:
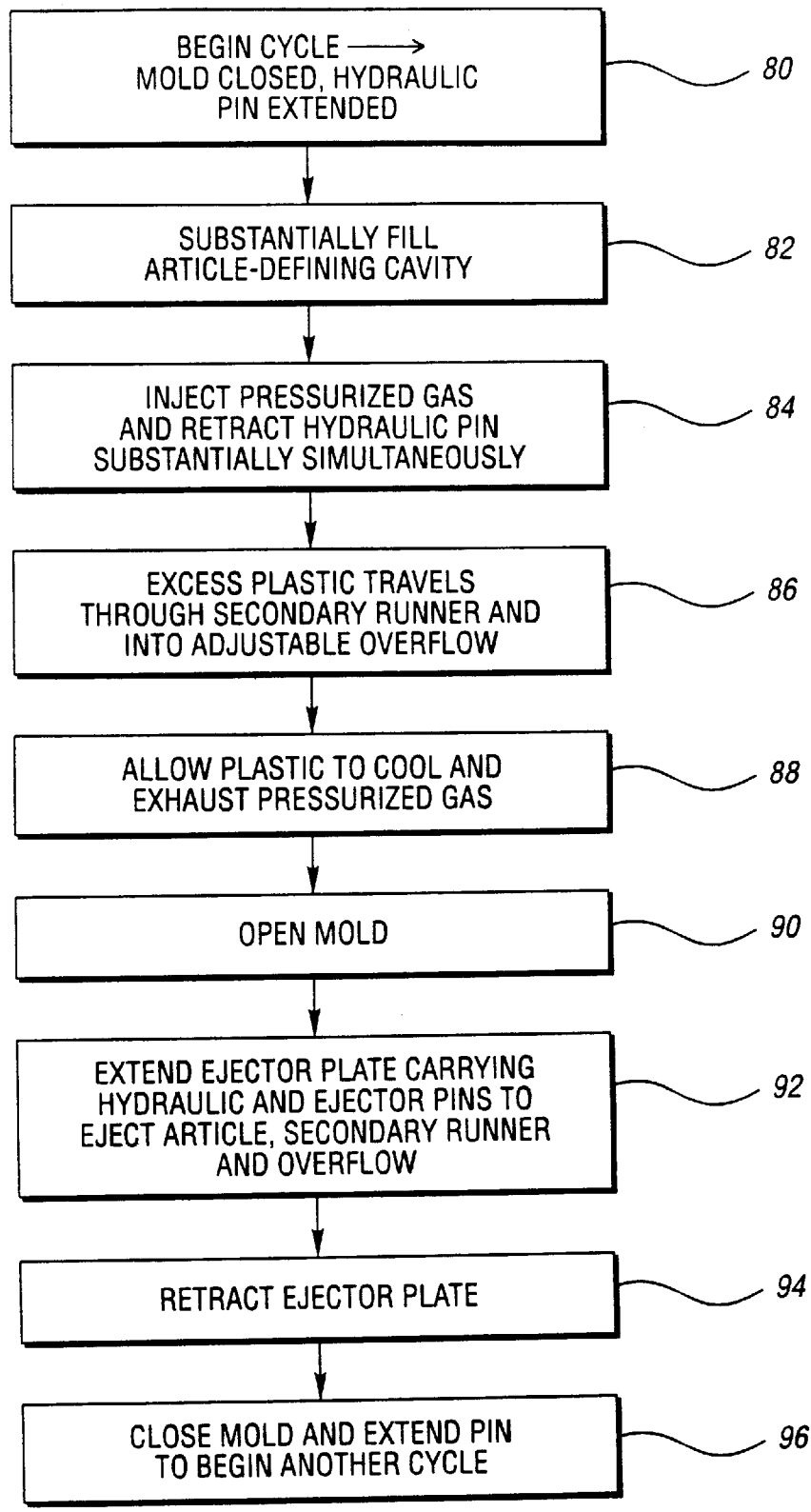
FIG. 2 is a block diagram flow chart illustrating the various steps utilized in a gas-assisted injection molding system which utilizes the mold and the adjustable overflow pin assembly of the present invention.

Referring now to FIG. 2, there is illustrated in block diagram flow chart form various process steps implemented by a gas-assisted injected molding system including the mold 10 of the present invention.

At block 80, an injection molding cycle begins wherein the mold 10 is closed and the hydraulic or blocking pin 72 is extended within the vertically extending portion 53 of the secondary runner 52 to block the secondary runner 52 as illustrated in FIG. 1.

At block 82, the article-defining cavity 16 is substantially filled with plastic.

At block 84, pressurized gas is injected into the article-defining cavity 16 and the hydraulic pin 72 is retracted substantially simultaneously with the injection of pressurized gas.

At block 86, excess plastic displaced by the pressurized gas within the article-defining cavity 16 travels through the secondary runner 52 and into the adjustable overflow or spill cavity 50.

At block 88, the molten plastic within the article-defining cavity 16, within the secondary runner 52 and within the spill cavity 50 is allowed to cool and the pressurized gas is exhausted from the article-defining cavity 16.

At block 90, the mold 10 is opened.

At block 92, the ejector plate 29 which carries the hydraulic cylinder 76, the ejector pin 60, and the other ejector pins 28 is extended toward the mold half 14 and the pins 72 and 28 and the shims 62 eject plastic from the sprue 22 and runner 24, the plastic article from the article-defining cavity 16, plastic from the secondary runner 52, and plastic from the overflow or spill cavity 50.

At block 94, the ejector plate 94 is retracted by moving it relative to the mold half 12 to the position shown in FIG. 1.

At block 96, the mold 10 is closed and the pin 72 is extended to block the portion 53 of the secondary runner 52 to await the beginning of another injection molding cycle.

While the best mode for carrying out the invention has been described in detail, those familiar with the art to which this invention relates will recognize various alternative designs and embodiments for practicing the invention as defined by the following claims.

What is claimed is:

1. A mold for use in a gas-assisted injection molding system, the mold comprising:

a first mold half;

a second mold half, the first and second mold halves being movable relative to each other between an open position and a closed position, wherein the first and second mold halves define an article-defining cavity, a conically-shaped spill cavity, and a secondary runner for flow coupling the spill cavity to the article-defining cavity; and an adjustable overflow pin assembly including:

a pin slidably fit within the second mold half to move relative to the second mold half in the open position of the mold between extended and retracted positions; and a conical stack of shims removably secured to the pin to move therewith within the conically-shaped spill cavity, the shims ejecting plastic from the spill cavity in the extended position of the pin and the shims having a tight fit within the spill cavity in the retracted position of the pin.

2. The mold as claimed in claim 1 wherein the conical stack of shims has an outer surface taper approximately in the range of 2° to 8°.

3. The mold as claimed in claim 2 wherein the outer surface taper is approximately 5°.

4. The mold as claimed in claim 1 wherein the pin is an ejector pin having an end face and wherein the assembly further includes a fastener for removably securing the conical stack of shims to the ejector pin.

5. The mold as claimed in claim 1 wherein the shims are annular shims and wherein the pin has a hole which extends through an end face thereof and wherein the fastener extends through the annular shims and into the hole to removably secure the stack of shims to the pin.

6. The mold as claimed in claim 5 wherein the fastener is adjustably secured within the hole of the pin at a desired one of a plurality of possible holding positions to permit a variable number of shims to be secured at the end face of the pin.

7. The mold as claimed in claim 6 wherein the hole is internally threaded and the fastener is externally threaded.

8. The mold as claimed in claim 7 wherein the fastener is a screw having a head portion in abutting engagement with a top shim of the stack of shims to secure the stack of shims to the pin.

9. The mold as claimed in claim 8 wherein a top surface of the head portion is flush with a top surface of the top shim at the desired one of the plurality of possible holding positions.

10. A pin assembly for use in a mold having a first mold half and a second mold half, wherein the first and second mold halves define an article-defining cavity, a conically-shaped spill cavity, and a secondary runner for flow coupling the spill cavity to the article-defining cavity, and an adjustable overflow pin assembly comprising:

a pin slidably fit within the second mold half to move relative to the second mold half in an open position of the mold between extended and retracted positions; and a conical stack of shims removably secured to the pin to move therewith within the conically-shaped spill cavity, the shims ejecting plastic from the spill cavity in the extended position of the pin and the shims having a tight fit within the spill cavity in the retracted position of the pin.

11. The pin assembly as claimed in claim 10 wherein the conical stack of shims has an outer surface taper approximately in the range of 2° to 8°.

12. The pin assembly as claimed in claim 11 wherein the outer surface taper is approximately 5°.

13. The pin assembly as claimed in claim 10 wherein the pin is an ejector pin having an end face and wherein the assembly further includes a fastener for removably securing the stack of shims to the ejector pin.

14. The pin assembly as claimed in claim 13 wherein the shims are annular shims and wherein the pin has a hole which extends through an end face thereof and wherein the fastener extends through the annular shims and into the hole to removably secure the stack of shims to the pin.

15. The pin assembly as claimed in claim 14 wherein the fastener is adjustably secured within the hole of the pin at a desired one of a plurality of possible holding positions to permit a variable number of shims to be secured at the end face of the pin.

16. The pin assembly as claimed in claim 15 wherein the hole is internally threaded and the fastener is externally threaded.

17. The pin assembly as claimed in claim 16 wherein the fastener is a screw having a head portion in abutting engagement with a top shim of the stack of shims to secure the stack of shims to the pin.

18. The pin assembly as claimed in claim 17 wherein a top surface of the head portion is flush with a top surface of the top shim at the desired one of the plurality of possible holding positions.

* * * * *